US012750151B2

(12) United States Patent
Zarkovsky et al.

(10) Patent No.: US 12,750,151 B2

(45) Date of Patent: Sep. 29, 2026

(54) CDMA OVER WDM AS A LINK MANAGEMENT PROTOCOL

(71) Applicant: NVIDIA Corp., Santa Clara, CA (US)

(72) Inventors: Segev Binyamin Zarkovsky, Kiryat Tiv'on (IL); Shai Cohen, Haifa (IL)

(73) Assignee: NVIDIA Corp., Santa Clara, CA (US)

(*) Notice: Subject to any disclaimer, the term of this patent is extended or adjusted under 35 U.S.C. 154(b) by 251 days.

(21) Appl. No.: 18/438,897

(22) Filed: Feb. 12, 2024

(65) Prior Publication Data

US 2025/0260502 A1 Aug. 14, 2025

(51) Int. Cl.
*H04J 14/00* (2006.01)
*H04J 14/02* (2006.01)

(52) U.S. Cl.
CPC ............ *H04J 14/005* (2013.01); *H04J 14/02* (2013.01)

(58) Field of Classification Search
CPC ................................ H04J 14/005; H04J 14/02
USPC .......................................................... 398/204
See application file for complete search history.

(56) References Cited

U.S. PATENT DOCUMENTS

| | | | | |
|---|---|---|---|---|
| 6,025,944 | A * | 2/2000 | Mendez | H04J 14/0307 398/1 |
| 6,922,431 | B1 * | 7/2005 | Weber | H04J 14/0298 375/130 |
| 9,225,453 | B2 * | 12/2015 | Fang | H04B 10/516 |
| 11,469,764 | B2 * | 10/2022 | Seyedi | H03K 17/78 |
| 2008/0235386 | A1 * | 9/2008 | Oommen | H04L 63/062 709/230 |
| 2010/0086304 | A1 * | 4/2010 | Mizutani | H04J 14/0282 398/71 |
| 2011/0236017 | A1 * | 9/2011 | Ohlen | H04B 10/07955 398/34 |

* cited by examiner

*Primary Examiner* — Dalzid E Singh
(74) *Attorney, Agent, or Firm* — Carnelian Law, LLC

(57) ABSTRACT

An optical communication system includes at least one wave division multiplex (WDM) transmitter configured to generate WDM signals in multiple channels on a light guide, and a Code Division Multiple Access (CDMA) symbol generator coupled to modulate output of the WDM transmitter at a frequency below a noise floor of the WDM signals.

17 Claims, 12 Drawing Sheets

CDMA OVER WDM AS A LINK MANAGEMENT PROTOCOL

BACKGROUND

Wave division multiplexing (WDM) is a technique used in optical communications to transmit multiple signals simultaneously over a single optical fiber. It works by dividing the available bandwidth into multiple frequency bands, called channels, with each channel capable of carrying a separate data signal. Each channel is assigned a specific wavelength of light, hence the term "wave division" multiplexing. By utilizing different wavelengths of light to communicate data in different channels, WDM enables the parallel transmission of multiple data signals, increasing the bandwidth capacity and efficiency of optical communication systems.

Code Division Multiple Access (CDMA) is a technique utilized, for example, in cellular in telecommunication systems to transmit wireless data signals. CDMA enables multiple users to transmit simultaneously over the same frequency band by utilizing unique codes to differentiate between different signals. In CDMA, each user's signal is encoded with a specific code, which spreads the signal across a wider bandwidth. This spreading of signals enables multiple data streams to coexist within the same frequency band without interfering with one other. The CDMA receiver applies a particular user's code to decode the desired signal and reject signals that don't match the code. Each user's signal occupies the entire available bandwidth but is distinguished by its unique code.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of mechanisms to mark different WDM channels by way of the transmission and detection of CDMA symbols superimposed on the WDM channels. The CDMA symbols exhibit high crosstalk tolerance and function as meta-data/control signals without generating interference in the WDM channels, within operational margins. Unlike conventional approaches to marking different WDM channels, the disclosed mechanisms do not rely upon signals with time domain orthogonality and obviate the need for synchronization. The disclosed mechanisms have many applications, such as authentication, polarization recovery, wavelength enumeration, crosstalk measurement, optical packet routing, and security.

Orthogonal PAM (Pulse Amplitude Modulation) symbols (OPAM symbols) are modulated by different amplitudes and also formed orthogonal to one other to minimize interference. In a traditional PAM system, symbols are represented by different amplitude levels, where each level corresponds to a specific bit pattern. In OPAM, symbols are chosen in such a way that the inner product between any two different symbols is zero.

Orthogonal functions (i.e., algorithms) have the distinguishing characteristic that their inner product is zero when integrated over a specific interval. Mathematically, the inner product between two orthogonal functions is defined as their dot product integrated over a given interval, resulting in zero. Signals embodying these functions may be transmitted simultaneously without generating substantial interference between them. One commonly used set of orthogonal functions in wireless communications is the Orthogonal Frequency Division Multiplexing (OFDM) system. In OFDM, the transmitted signal is composed of multiple orthogonal subcarriers, each representing a specific frequency. The orthogonality between subcarriers enables them to overlap in the frequency domain without causing interference. Other examples of orthogonal functions include Walsh codes and the Hadamard codes. These orthogonal codes facilitate multiple access and signal separation by exploiting orthogonality properties.

A fraction of each WDM channel carries a portion of the spread spectrum of a CDMA signal. The CDMA signal is modulated using OPAM symbol out of a defined finite ensemble. The configured orthogonal function comprises the transmitted message. The receiver taps the WDM channel, extracts the content of the CDMA signal, and applies a maximum correlation decoder to identify the transmitted OPAM signal.

The ratio of the CDMA signal bandwidth to the WDM signal bandwidth is set such that the CDMA signal is communicated below the noise floor of the WDM signal and therefore does not interrupt or interfere with the WDM data stream.

The CDMA detection is performed by applying functional orthogonality, whereby the WDM data stream has characteristics that approximate an orthogonal CDMA symbol and is rejected by the correlation detector.

Figure 1:
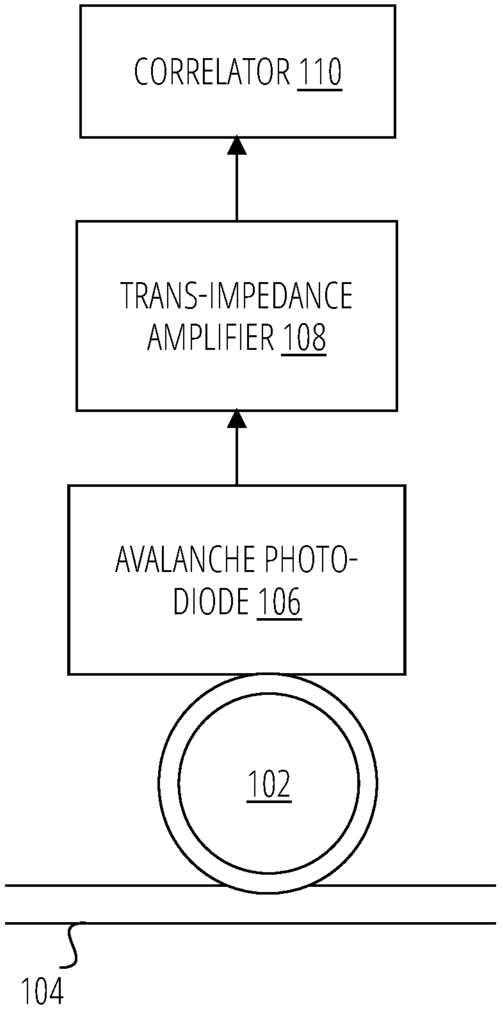
FIG. 1 depicts an optical detector/correlator in one embodiment.

FIG. 1 depicts an optical detector/correlator in one embodiment. A drop filter 102 taps a small portion of the light of a target wavelength on light guide 104, utilizing for example a high-Q ring to reject WDM data signals. A detector comprising an avalanche photo-diode 106 and trans-impedance amplifier 108 is applied to detect low-power low-bandwidth CDMA signals and reject the higher-frequency WDM data signals. In some embodiments, the analog output of the trans-impedance amplifier 108 is converted to the digital domain for further processing, e.g., by a digital signal processor (DSP). Output of the detector is applied to a correlator 110 (e.g., a match filter or other correlation logic) to correlate the CDMA signals with a particular orthogonal series of a preconfigured ensemble.

Figure 2:
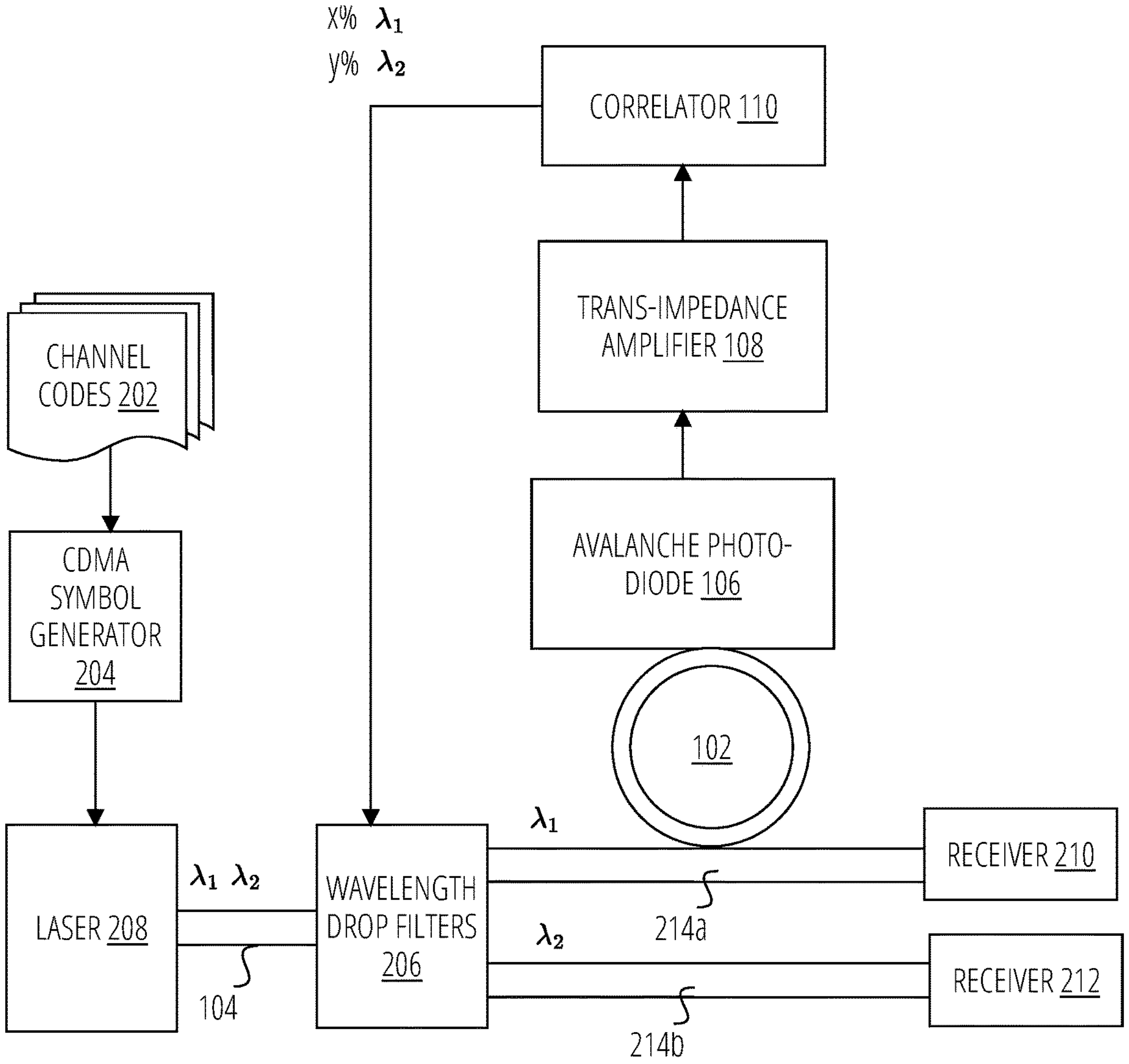
FIG. 2 depicts an optical system in one embodiment wherein CDMA channel codes are utilized to enable efficient wavelength locking and cross-talk quantification.

FIG. 2 depicts an optical system in one embodiment, wherein channel codes 202 are transformed by a CDMA symbol generator 204 and superimposed with WDM signals onto a light guide 104. Generally, an optical transmitter and/or communication system may include at least one laser configured to generate a wave division multiplex (WDM) on a light guide and a Code Division Multiple Access (CDMA) symbol generator coupled to modulate CDMA symbols on the light guide across a plurality of channels of the WDM (e.g., in a spread-spectrum manner). In one particular embodiment, the CDMA symbols are modulated onto the light guide 104 at a level below a noise floor of WDM signals. In the depicted example, the CDMA symbols are amplitude modulated onto the light guide 104 by modulating the laser power. However other known mechanisms for modulating laser signals may also be utilized.

Although not depicted in FIG. 2, unless the destination is the WDM modulator itself, components to implement the modulation of the WDM signals on the light guide 104 should be understood to be present at some point between the laser source and the receiver/destination.

The noise floor of a communication system refers to the inherent background noise or unwanted signals that affect the quality of the communicated signals. In a communication system, various factors such as electronic components, environmental conditions, and other sources of interference contribute to the noise floor. This noise floor sets a lower limit on the signal-to-noise ratio (SNR) that can be achieved for particular signals in the system.

When a signal is below the noise floor of a system, it means that the amplitude or power of the signal is weaker than the level of background noise or interference presented to the WDM signal detectors. In practical terms, if a signal falls below the noise floor, it presents to the WDM detectors as indistinguishable from the system's inherent noise.

The CDMA symbols are utilized as channel identifiers to enable efficient wavelength locking and cross-talk quantification. The correlator 110 extracts the CDMA symbols and utilized them to determine a metric of crosstalk between the WDM channels. Outputs of the correlator 110 indicate a level of channel crosstalk and are applied to maintain the tuning (e.g., via thermal adjustment) of the wavelength drop filters 206 that segregate different wavelengths generated by the laser 208 (or lasers) on different light guides 214*a*, 214*b* to different receivers 210, 212.

Figure 3:
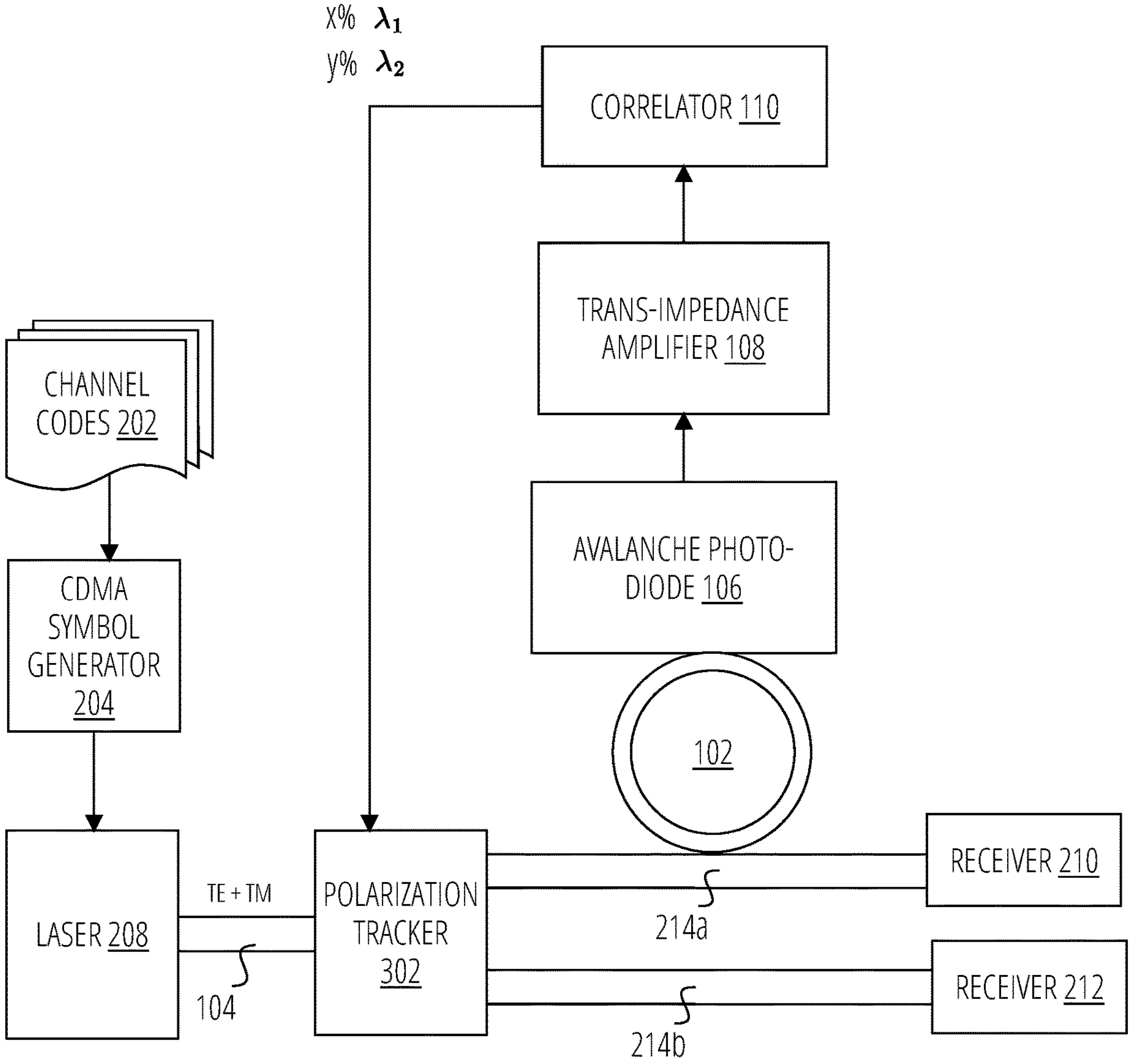
FIG. 3 depicts another embodiment of an optical system wherein CDMA channel codes are utilized to enable efficient wavelength locking and cross-talk quantification.

FIG. 3 depicts another example of an optical system wherein CDMA channel codes are utilized to enable efficient wavelength locking and cross-talk quantification. Light from the laser 208 is provided over a light guide 104 in a combination of transverse electric (TE) mode and transverse magnetic (TM) mode. The TE mode light comprises no electric field in the direction of propagation and therefor only a magnetic field along the direction of propagation. The TM mode light comprises no magnetic field in the direction of propagation and therefor only an electric field along the direction of propagation. Similar to the embodiment depicted in FIG. 2, outputs of the correlator 110 are applied to maintain the tuning (e.g., via thermal adjustment) of the polarization tracker 302 that segregates different polarizations generated by the laser 208 (or lasers) on different waveguides to different receivers 210, 212. This embodiment may be utilized in combination with an embodiment such as depicted in FIG. 2 to communicate signals encoded with a combination of different wavelengths and polarizations.

Figure 4:
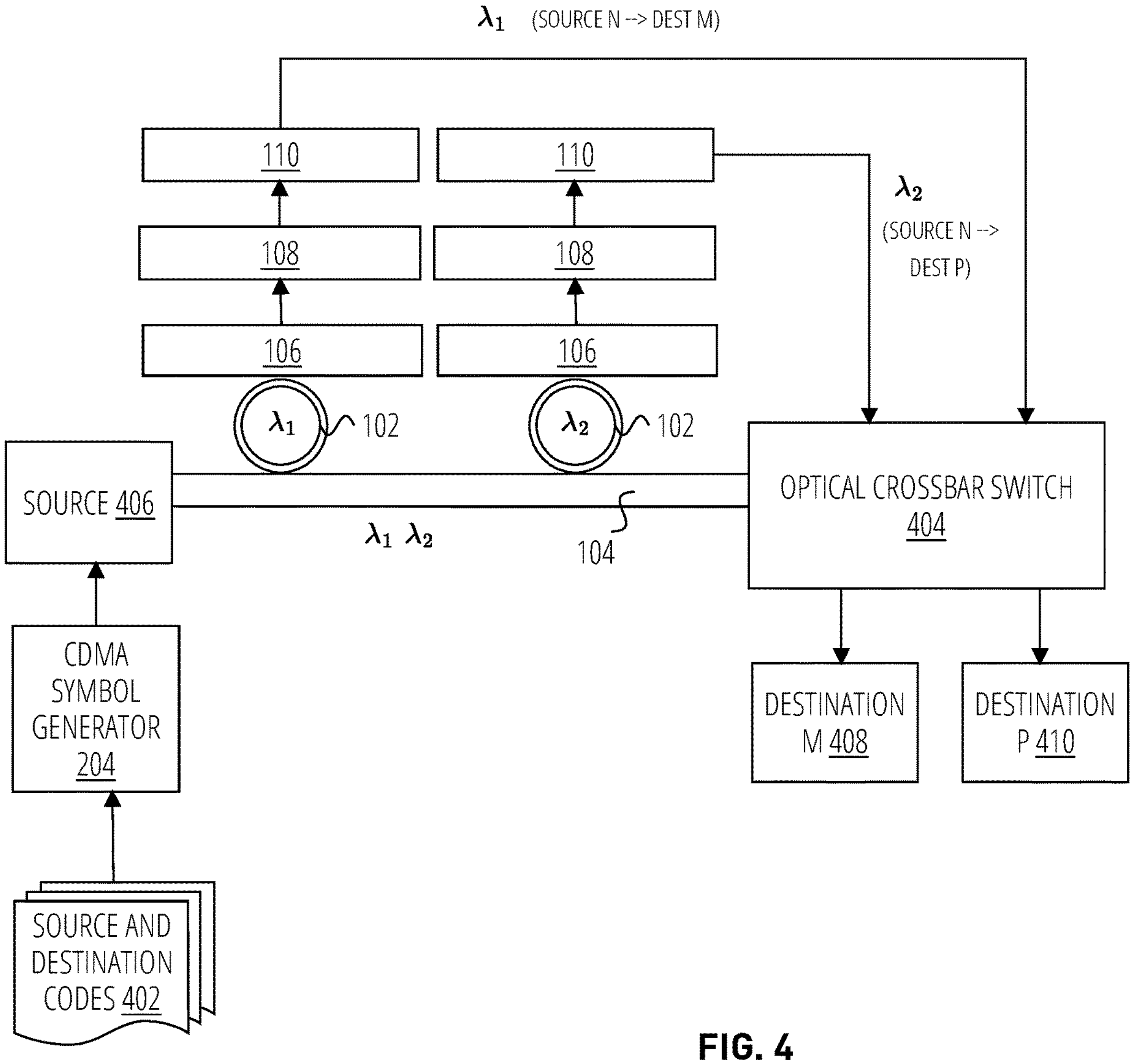
FIG. 4 depicts an optical system in one embodiment, wherein CDMA codes are source/destination identifiers utilized by an optical switch to control the switching/routing of light signals.

FIG. 4 depicts an optical system in one embodiment, wherein CDMA-encoded source and destination codes 402 utilized by an optical crossbar switch 404 to control the switching/routing of light signals from a source 406 to different destinations 408, 410.

Figure 5:
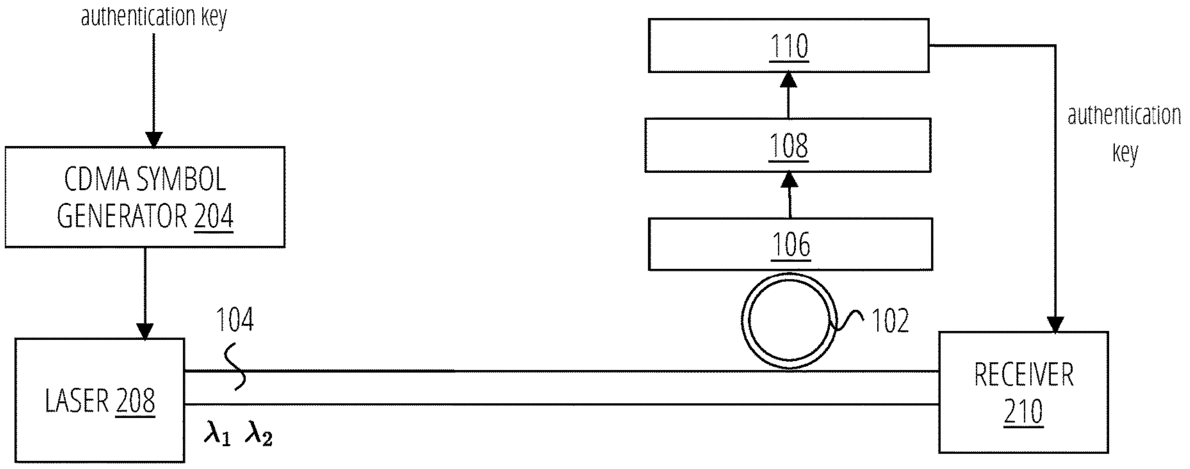
FIG. 5 depicts an optical system in one embodiment, wherein a security key/authentication secret code is CDMA encoded onto a low-bandwidth channel below the noise floor of the WDM signals

FIG. 5 depicts an optical system in one embodiment, wherein a security key/authentication secret code is CDMA encoded onto a low-bandwidth channel below the noise floor of the WDM signals, and is challenging to detect without knowledge of the CDMA ensemble used to communicate the secret code.

The mechanisms disclosed herein may be implemented computing devices utilizing one or more graphic processing unit (GPU) and/or general purpose data processor (e.g., a central processing unit or CPU). Exemplary architectures will now be described that may be configured with the mechanisms disclosed herein. In general, the disclosed mechanisms may be utilized to implement any internal or external signal distribution path over optical links within or between any of the machine components described below, including in environments such as data centers, automobiles, and robotics or manufacturing where one or both of high-bandwidth and noise-resistance are beneficial.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 6:
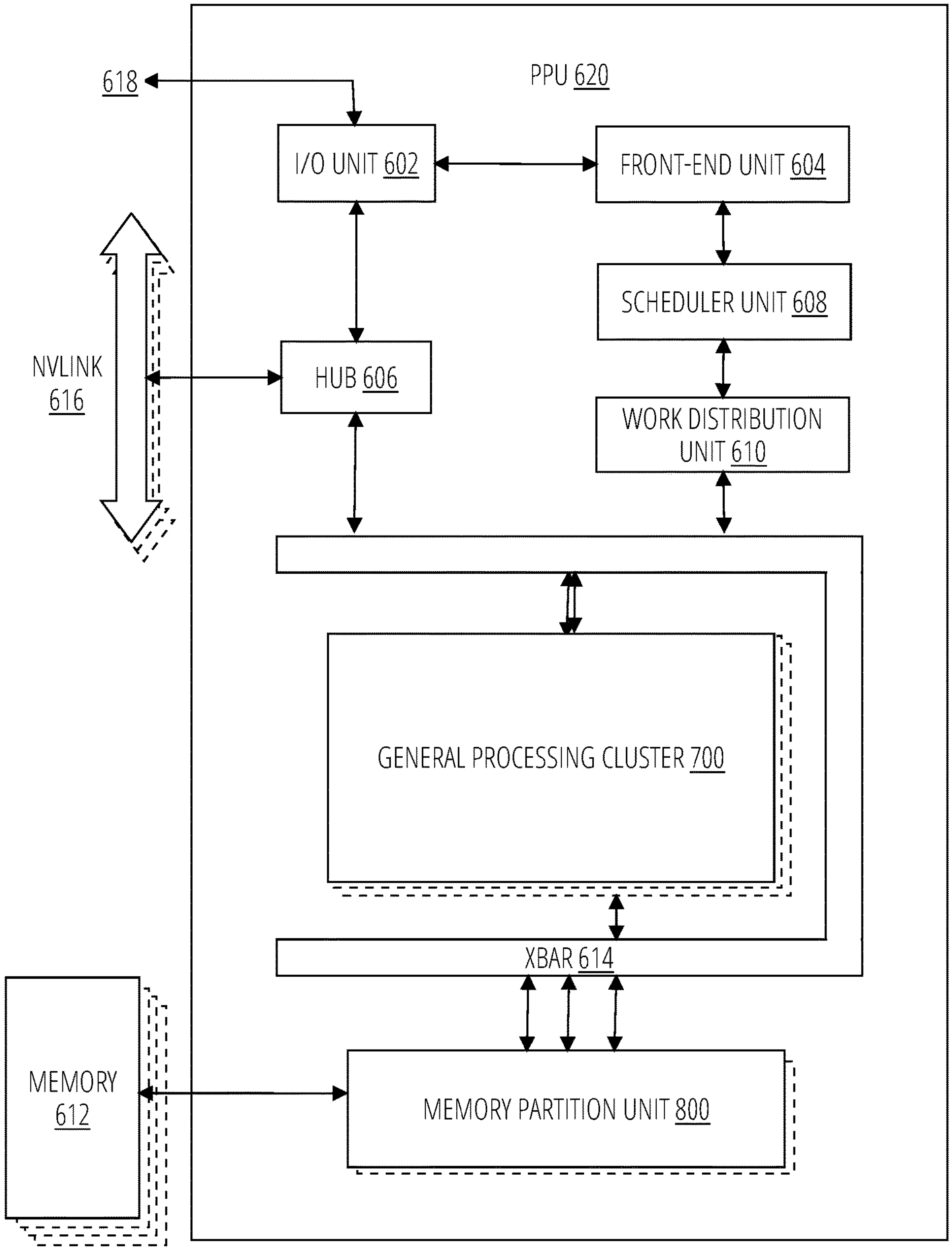
FIG. 6 depicts a parallel processing unit 620 in accordance with one embodiment.

FIG. 6 depicts a parallel processing unit 620, in accordance with an embodiment. In an embodiment, the parallel processing unit 620 is a multi-threaded processor that is implemented on one or more integrated circuit devices. The parallel processing unit 620 is a latency hiding architecture designed to process many threads in parallel. A thread (e.g., a thread of execution) is an instantiation of a set of instructions configured to be executed by the parallel processing unit 620. In an embodiment, the parallel processing unit 620 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 620 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 620 modules may be configured to accelerate thousands of High Performance Computing (HPC), data center, and machine learning applications. The parallel processing unit 620 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 6, the parallel processing unit 620 includes an I/O unit 602, a front-end unit 604, a scheduler unit 608, a work distribution unit 610, a hub 606, a crossbar 614, one or more general processing cluster 700 modules, and one or more memory partition unit 800 modules. The crossbar 614 may utilize the disclosed mechanisms to route optical signals between particular source and destination components of the system.

The parallel processing unit 620 may be connected to a host processor or other parallel processing unit 620 modules via one or more high-speed NVLink 616 interconnects. The parallel processing unit 620 may be connected to a host processor or other peripheral devices via an interconnect 618. The parallel processing unit 620 may also be connected to a local memory comprising a number of memory 612 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 612 may comprise logic to configure the parallel processing unit 620 to carry out aspects of the techniques disclosed herein.

The NVLink 616 interconnect enables systems to scale and include one or more parallel processing unit 620 modules combined with one or more CPUs, supports cache coherence between the parallel processing unit 620 modules and CPUs, and CPU mastering. Data and/or commands may be transmitted by the NVLink 616 through the hub 606 to/from other units of the parallel processing unit 620 such as one or more copy engines, a video encoder, a video decoder, a power management unit, etc. (not explicitly shown). The NVLink 616 is described in more detail in conjunction with FIG. 10.

The I/O unit 602 is configured to transmit and receive communications (e.g., commands, data, etc.) from a host processor (not shown) over the interconnect 618. The I/O unit 602 may communicate with the host processor directly via the interconnect 618 or through one or more intermediate devices such as a memory bridge. In an embodiment, the I/O unit 602 may communicate with one or more other processors, such as one or more parallel processing unit 620 modules via the interconnect 618. In an embodiment, the I/O unit 602 implements a Peripheral Component Interconnect Express (PCIe) interface for communications over a PCIe bus and the interconnect 618 is a PCIe bus. In alternative embodiments, the I/O unit 602 may implement other types of well-known interfaces for communicating with external devices.

The I/O unit 602 decodes packets received via the interconnect 618. In an embodiment, the packets represent commands configured to cause the parallel processing unit 620 to perform various operations. The I/O unit 602 transmits the decoded commands to various other units of the parallel processing unit 620 as the commands may specify. For example, some commands may be transmitted to the front-end unit 604. Other commands may be transmitted to the hub 606 or other units of the parallel processing unit 620 such as one or more copy engines, a video encoder, a video decoder, a power management unit, etc. (not explicitly shown). In other words, the I/O unit 602 is configured to route communications between and among the various logical units of the parallel processing unit 620.

In an embodiment, a program executed by the host processor encodes a command stream in a buffer that provides workloads to the parallel processing unit 620 for processing. A workload may comprise several instructions and data to be processed by those instructions. The buffer is a region in a memory that is accessible (e.g., read/write) by both the host processor and the parallel processing unit 620. For example, the I/O unit 602 may be configured to access the buffer in a system memory connected to the interconnect 618 via memory requests transmitted over the interconnect 618. In an embodiment, the host processor writes the command stream to the buffer and then transmits a pointer to the start of the command stream to the parallel processing unit 620. The front-end unit 604 receives pointers to one or more command streams. The front-end unit 604 manages the one or more streams, reading commands from the streams and forwarding commands to the various units of the parallel processing unit 620.

The front-end unit 604 is coupled to a scheduler unit 608 that configures the various general processing cluster 700 modules to process tasks defined by the one or more streams. The scheduler unit 608 is configured to track state information related to the various tasks managed by the scheduler unit 608. The state may indicate which general processing cluster 700 a task is assigned to, whether the task is active or inactive, a priority level associated with the task, and so forth. The scheduler unit 608 manages the execution of a plurality of tasks on the one or more general processing cluster 700 modules.

The scheduler unit 608 is coupled to a work distribution unit 610 that is configured to dispatch tasks for execution on the general processing cluster 700 modules. The work distribution unit 610 may track a number of scheduled tasks received from the scheduler unit 608. In an embodiment, the work distribution unit 610 manages a pending task pool and an active task pool for each of the general processing cluster 700 modules. The pending task pool may comprise a number of slots (e.g., 32 slots) that contain tasks assigned to be processed by a particular general processing cluster 700. The active task pool may comprise a number of slots (e.g., 4 slots) for tasks that are actively being processed by the general processing cluster 700 modules. As a general processing cluster 700 finishes the execution of a task, that task is evicted from the active task pool for the general processing cluster 700 and one of the other tasks from the pending task pool is selected and scheduled for execution on the general processing cluster 700. If an active task has been idle on the general processing cluster 700, such as while waiting for a data dependency to be resolved, then the active task may be evicted from the general processing cluster 700 and returned to the pending task pool while another task in the pending task pool is selected and scheduled for execution on the general processing cluster 700.

The work distribution unit 610 communicates with the one or more general processing cluster 700 modules via crossbar 614. The crossbar 614 is an interconnect network that couples many of the units of the parallel processing unit 620 to other units of the parallel processing unit 620. For example, the crossbar 614 may be configured to couple the work distribution unit 610 to a particular general processing cluster 700. Although not shown explicitly, one or more other units of the parallel processing unit 620 may also be connected to the crossbar 614 via the hub 606.

The tasks are managed by the scheduler unit 608 and dispatched to a general processing cluster 700 by the work distribution unit 610. The general processing cluster 700 is configured to process the task and generate results. The results may be consumed by other tasks within the general processing cluster 700, routed to a different general processing cluster 700 via the crossbar 614, or stored in the memory 612. The results can be written to the memory 612 via the memory partition unit 800 modules, which implement a memory interface for reading and writing data to/from the memory 612. The results can be transmitted to another parallel processing unit 620 or CPU via the NVLink 616. In an embodiment, the parallel processing unit 620 includes a number U of memory partition unit 800 modules that is equal to the number of separate and distinct memory 612 devices coupled to the parallel processing unit 620. A memory partition unit 800 will be described in more detail below in conjunction with FIG. 8.

In an embodiment, a host processor executes a driver kernel that implements an application programming interface (API) that enables one or more applications executing on the host processor to schedule operations for execution on the parallel processing unit 620. In an embodiment, multiple compute applications are simultaneously executed by the parallel processing unit 620 and the parallel processing unit 620 provides isolation, quality of service (QOS), and independent address spaces for the multiple compute applications. An application may generate instructions (e.g., API calls) that cause the driver kernel to generate one or more tasks for execution by the parallel processing unit 620. The driver kernel outputs tasks to one or more streams being processed by the parallel processing unit 620. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 9.

Figure 7:
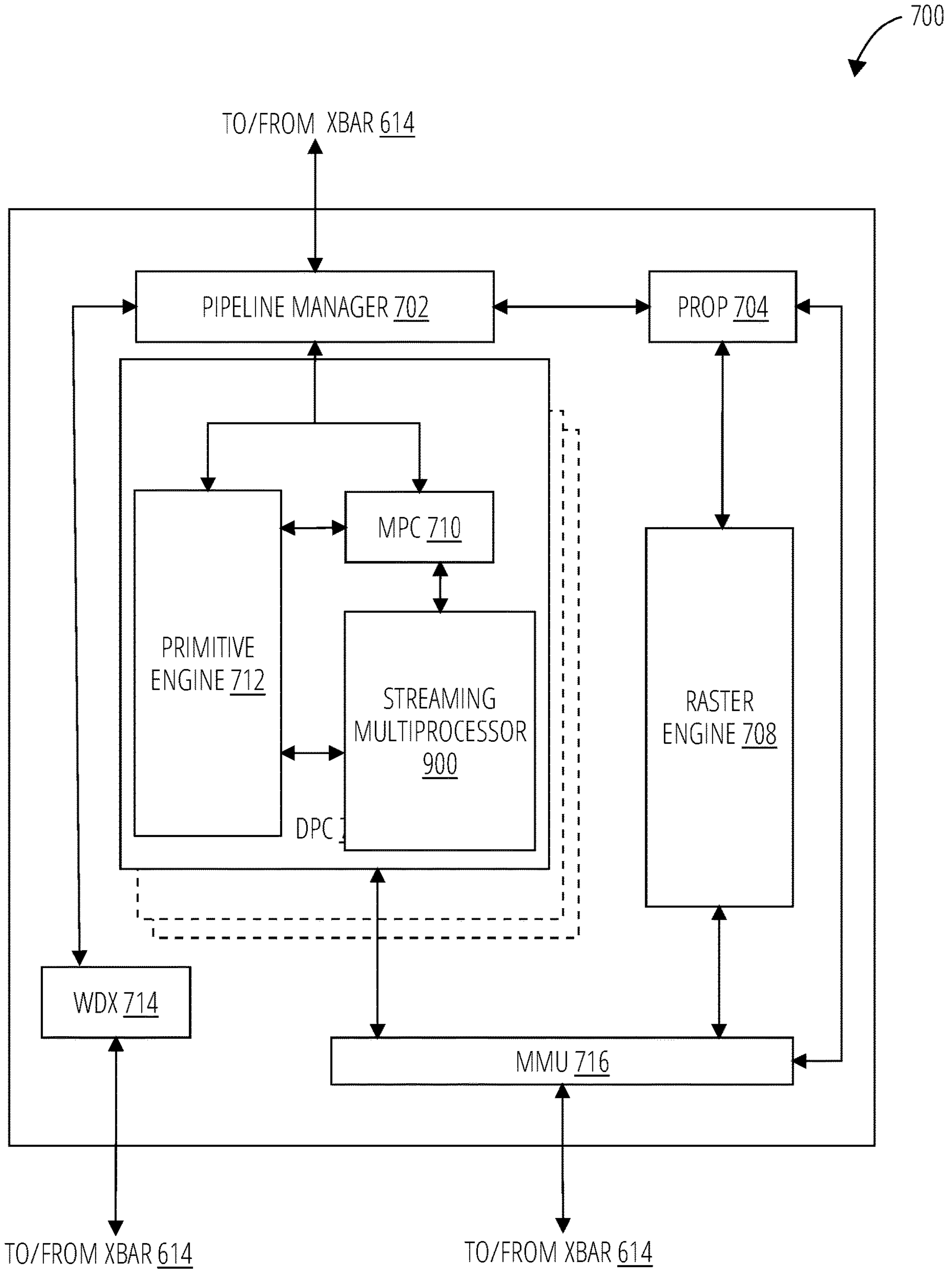
FIG. 7 depicts a general processing cluster 700 in accordance with one embodiment.

FIG. 7 depicts a general processing cluster 700 of the parallel processing unit 620 of FIG. 6, in accordance with an embodiment. As shown in FIG. 7, each general processing cluster 700 includes a number of hardware units for processing tasks. In an embodiment, each general processing cluster 700 includes a pipeline manager 702, a pre-raster operations unit 704, a raster engine 708, a work distribution crossbar 714, a memory management unit 716, and one or more data processing cluster 706. The work distribution crossbar 714 may utilize the disclosed mechanisms to route optical signals between particular source and destination components of the system. It will be appreciated that the general processing cluster 700 of FIG. 7 may include other hardware units in lieu of or in addition to the units shown in FIG. 7.

In an embodiment, the operation of the general processing cluster 700 is controlled by the pipeline manager 702. The pipeline manager 702 manages the configuration of the one or more data processing cluster 706 modules for processing tasks allocated to the general processing cluster 700. In an embodiment, the pipeline manager 702 may configure at least one of the one or more data processing cluster 706 modules to implement at least a portion of a graphics rendering pipeline. For example, a data processing cluster 706 may be configured to execute a vertex shader program on the programmable streaming multiprocessor 900. The pipeline manager 702 may also be configured to route packets received from the work distribution unit 610 to the appropriate logical units within the general processing cluster 700. For example, some packets may be routed to fixed function hardware units in the pre-raster operations unit 704 and/or raster engine 708 while other packets may be routed to the data processing cluster 706 modules for processing by the primitive engine 712 or the streaming multiprocessor 900. In an embodiment, the pipeline manager 702 may configure at least one of the one or more data processing cluster 706 modules to implement a neural network model and/or a computing pipeline.

Figure 8:
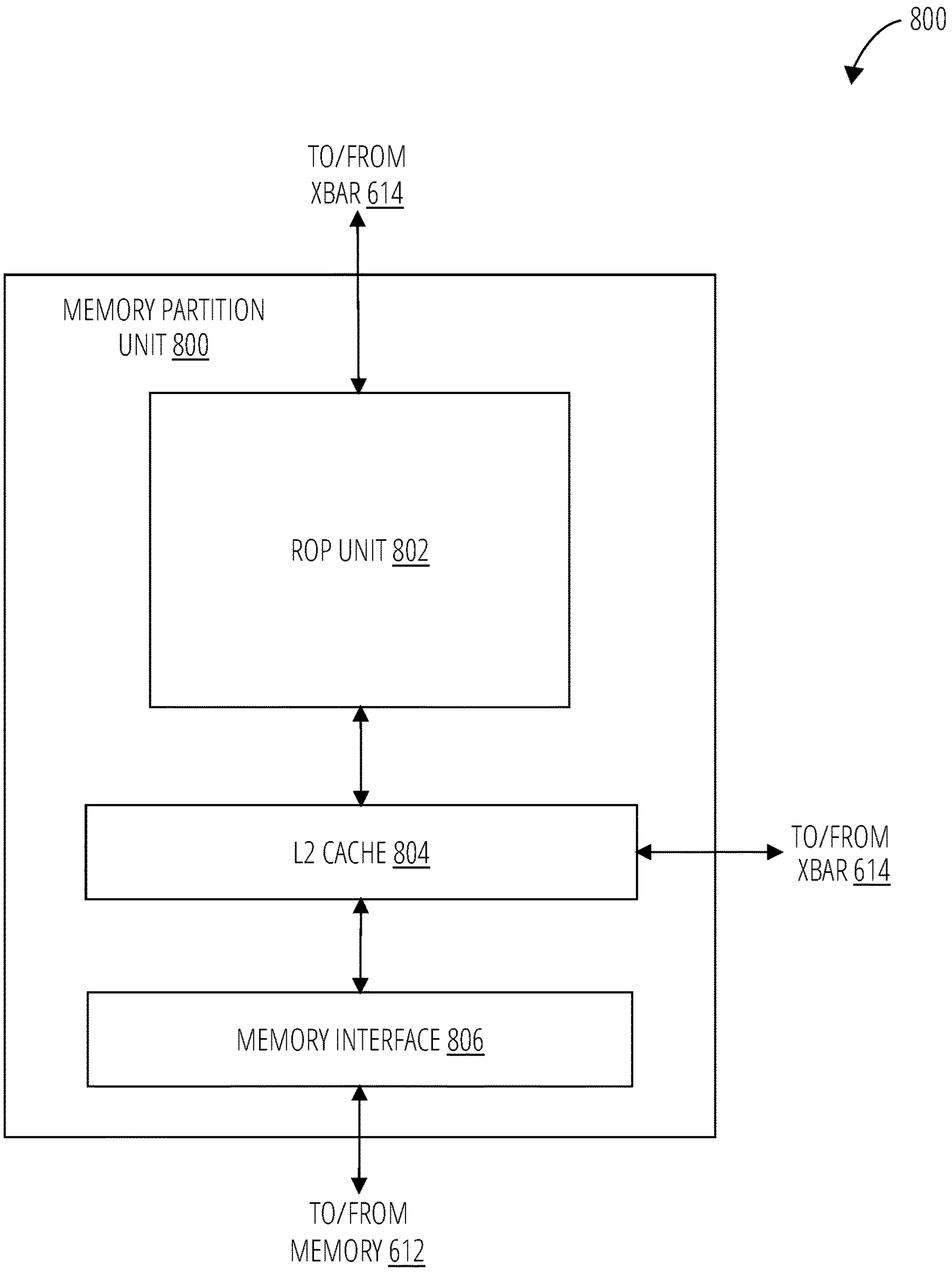
FIG. 8 depicts a memory partition unit 800 in accordance with one embodiment.

The pre-raster operations unit 704 is configured to route data generated by the raster engine 708 and the data processing cluster 706 modules to a Raster Operations (ROP) unit, described in more detail in conjunction with FIG. 8. The pre-raster operations unit 704 may also be configured to perform optimizations for color blending, organize pixel data, perform address translations, and the like.

The raster engine 708 includes a number of fixed function hardware units configured to perform various raster operations. In an embodiment, the raster engine 708 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 708 comprises fragments to be processed, for example, by a fragment shader implemented within a data processing cluster 706.

Each data processing cluster 706 included in the general processing cluster 700 includes an M-pipe controller 710, a primitive engine 712, and one or more streaming multiprocessor 900 modules. The M-pipe controller 710 controls the operation of the data processing cluster 706, routing packets received from the pipeline manager 702 to the appropriate units in the data processing cluster 706. For example, packets associated with a vertex may be routed to the primitive engine 712, which is configured to fetch vertex attributes associated with the vertex from the memory 612. In contrast, packets associated with a shader program may be transmitted to the streaming multiprocessor 900.

The streaming multiprocessor 900 comprises a programmable streaming processor that is configured to process tasks represented by a number of threads. Each streaming multiprocessor 900 is multi-threaded and configured to execute a plurality of threads (e.g., 32 threads) from a particular group of threads concurrently. In an embodiment, the streaming multiprocessor 900 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 900 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 900 will be described in more detail below in conjunction with FIG. 9.

The memory management unit 716 provides an interface between the general processing cluster 700 and the memory partition unit 800. The memory management unit 716 may provide translation of virtual addresses into physical addresses, memory protection, and arbitration of memory requests. In an embodiment, the memory management unit 716 provides one or more translation lookaside buffers (TLBs) for performing translation of virtual addresses into physical addresses in the memory 612.

FIG. 8 depicts a memory partition unit 800 of the parallel processing unit 620 of FIG. 6, in accordance with an embodiment. As shown in FIG. 8, the memory partition unit 800 includes a raster operations unit 802, a level two cache 804, and a memory interface 806. The memory interface 806 is coupled to the memory 612. Memory interface 806 may implement 32, 64, 128, 1024-bit data buses, or the like, for high-speed data transfer. In an embodiment, the parallel processing unit 620 incorporates U memory interface 806 modules, one memory interface 806 per pair of memory partition unit 800 modules, where each pair of memory partition unit 800 modules is connected to a corresponding memory 612 device. For example, parallel processing unit 620 may be connected to up to Y memory 612 devices, such as high bandwidth memory stacks or graphics double-data-rate, version 5, synchronous dynamic random access memory, or other types of persistent storage.

In an embodiment, the memory interface 806 implements an HBM2 memory interface and Y equals half U. In an embodiment, the HBM2 memory stacks are located on the same physical package as the parallel processing unit 620, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 612 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 620 modules process very large datasets and/or run applications for extended periods.

In an embodiment, the parallel processing unit 620 implements a multi-level memory hierarchy. In an embodiment, the memory partition unit 800 supports a unified memory to provide a single unified virtual address space for CPU and parallel processing unit 620 memory, enabling data sharing between virtual memory systems. In an embodiment the frequency of accesses by a parallel processing unit 620 to memory located on other processors is traced to ensure that memory pages are moved to the physical memory of the parallel processing unit 620 that is accessing the pages more frequently. In an embodiment, the NVLink 616 supports address translation services allowing the parallel processing unit 620 to directly access a CPU's page tables and providing full access to CPU memory by the parallel processing unit 620.

In an embodiment, copy engines transfer data between multiple parallel processing unit 620 modules or between parallel processing unit 620 modules and CPUs. The copy engines can generate page faults for addresses that are not mapped into the page tables. The memory partition unit 800 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 612 or other system memory may be fetched by the memory partition unit 800 and stored in the level two cache 804, which is located on-chip and is shared between the various general processing cluster 700 modules. As shown, each memory partition unit 800 includes a portion of the level two cache 804 associated with a corresponding memory 612 device. Lower level caches may then be implemented in various units within the general processing cluster 700 modules. For example, each of the streaming multiprocessor 900 modules may implement an L1 cache. The L1 cache is private memory that is dedicated to a particular streaming multiprocessor 900. Data from the level two cache 804 may be fetched and stored in each of the L1 caches for processing in the functional units of the streaming multiprocessor 900 modules. The level two cache 804 is coupled to the memory interface 806 and the crossbar 614.

The raster operations unit 802 performs graphics raster operations related to pixel color, such as color compression, pixel blending, and the like. The raster operations unit 802 also implements depth testing in conjunction with the raster engine 708, receiving a depth for a sample location associated with a pixel fragment from the culling engine of the raster engine 708. The depth is tested against a corresponding depth in a depth buffer for a sample location associated with the fragment. If the fragment passes the depth test for the sample location, then the raster operations unit 802 updates the depth buffer and transmits a result of the depth test to the raster engine 708. It will be appreciated that the number of partition memory partition unit 800 modules may be different than the number of general processing cluster 700 modules and, therefore, each raster operations unit 802 may be coupled to each of the general processing cluster 700 modules. The raster operations unit 802 tracks packets received from the different general processing cluster 700 modules and determines which general processing cluster 700 that a result generated by the raster operations unit 802 is routed to through the crossbar 614. Although the raster operations unit 802 is included within the memory partition unit 800 in FIG. 8, in other embodiment, the raster operations unit 802 may be outside of the memory partition unit 800. For example, the raster operations unit 802 may reside in the general processing cluster 700 or another unit.

Figure 9:
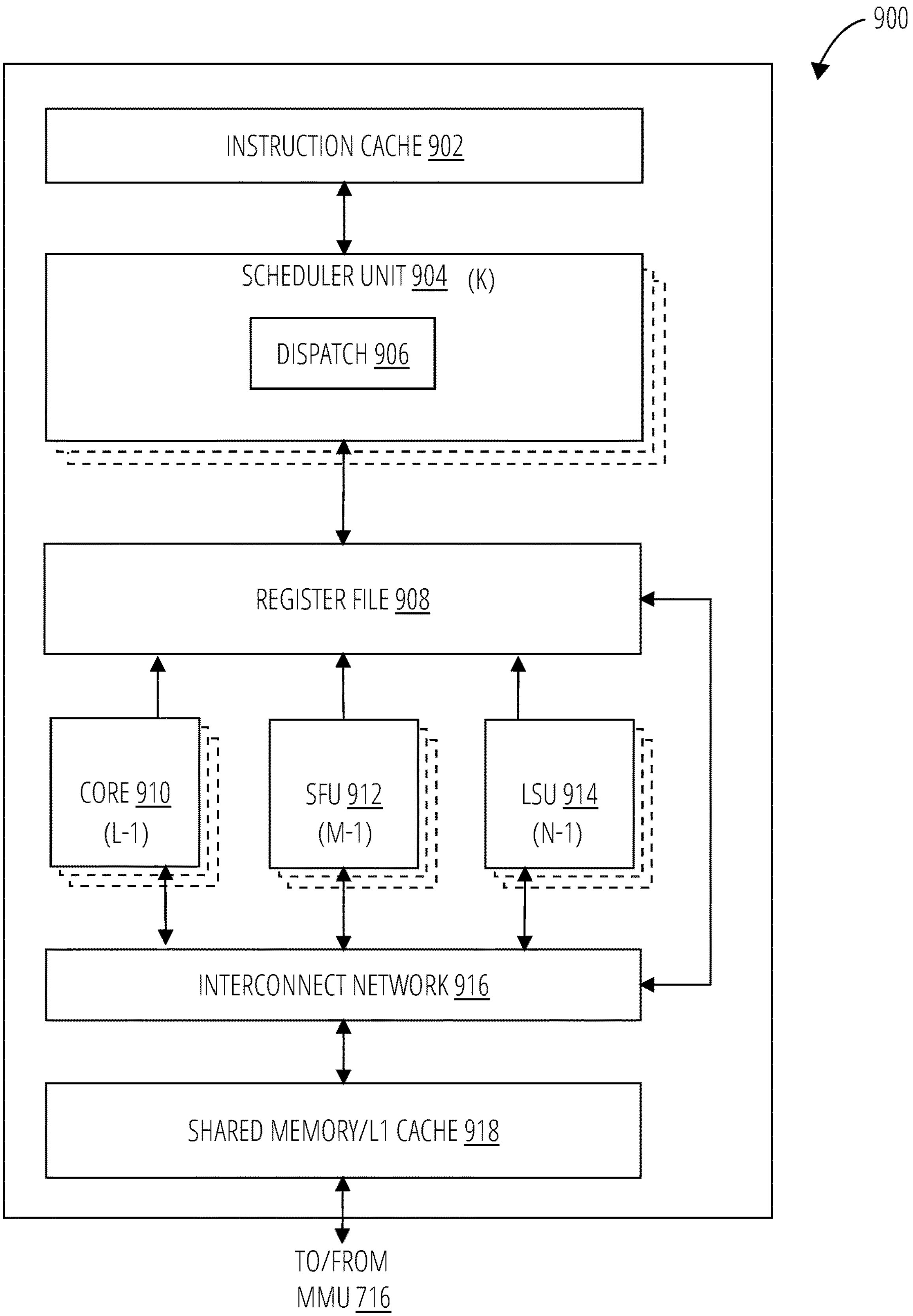
FIG. 9 depicts a streaming multiprocessor 900 in accordance with one embodiment.

FIG. 9 illustrates the streaming multiprocessor 900 of FIG. 7, in accordance with an embodiment. As shown in FIG. 9, the streaming multiprocessor 900 includes an instruction cache 902, one or more scheduler unit 904 modules (e.g., such as scheduler unit 608), a register file 908, one or more processing core 910 modules, one or more special function unit 912 modules, one or more load/store unit 914 modules, an interconnect network 916, and a shared memory/L1 cache 918.

As described above, the work distribution unit 610 dispatches tasks for execution on the general processing cluster 700 modules of the parallel processing unit 620. The tasks are allocated to a particular data processing cluster 706 within a general processing cluster 700 and, if the task is associated with a shader program, the task may be allocated to a streaming multiprocessor 900. The scheduler unit 608 receives the tasks from the work distribution unit 610 and manages instruction scheduling for one or more thread blocks assigned to the streaming multiprocessor 900. The scheduler unit 904 schedules thread blocks for execution as warps of parallel threads, where each thread block is allocated at least one warp. In an embodiment, each warp executes 32 threads. The scheduler unit 904 may manage a plurality of different thread blocks, allocating the warps to the different thread blocks and then dispatching instructions from the plurality of different cooperative groups to the various functional units (e.g., core 910 modules, special function unit 912 modules, and load/store unit 914 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 906 unit is configured within the scheduler unit 904 to transmit instructions to one or more of the functional units. In one embodiment, the scheduler unit 904 includes two dispatch 906 units that enable two different instructions from the same warp to be dispatched during each clock cycle. In alternative embodiments, each scheduler unit 904 may include a single dispatch 906 unit or additional dispatch 906 units.

Each streaming multiprocessor 900 includes a register file 908 that provides a set of registers for the functional units of the streaming multiprocessor 900. In an embodiment, the register file 908 is divided between each of the functional units such that each functional unit is allocated a dedicated portion of the register file 908. In another embodiment, the register file 908 is divided between the different warps being executed by the streaming multiprocessor 900. The register file 908 provides temporary storage for operands connected to the data paths of the functional units.

Each streaming multiprocessor 900 comprises L processing core 910 modules. In an embodiment, the streaming multiprocessor 900 includes a large number (e.g., 128, etc.) of distinct processing core 910 modules. Each core 910 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 910 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 910 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 900 also comprises M special function unit 912 modules that perform special functions (e.g., attribute evaluation, reciprocal square root, and the like). In an embodiment, the special function unit 912 modules may include a tree traversal unit configured to traverse a hierarchical tree data structure. In an embodiment, the special function unit 912 modules may include texture unit configured to perform texture map filtering operations. In an embodiment, the texture units are configured to load texture maps (e.g., a 2D array of texels) from the memory 612 and sample the texture maps to produce sampled texture values for use in shader programs executed by the streaming multiprocessor 900. In an embodiment, the texture maps are stored in the shared memory/L1 cache 918. The texture units implement texture operations such as filtering operations using mip-maps (e.g., texture maps of varying levels of detail). In an embodiment, each streaming multiprocessor 900 includes two texture units.

Each streaming multiprocessor 900 also comprises N load/store unit 914 modules that implement load and store operations between the shared memory/L1 cache 918 and the register file 908. Each streaming multiprocessor 900 includes an interconnect network 916 that connects each of the functional units to the register file 908 and the load/store unit 914 to the register file 908 and shared memory/L1 cache 918. In an embodiment, the interconnect network 916 is a crossbar that can be configured to connect any of the functional units to any of the registers in the register file 908 and connect the load/store unit 914 modules to the register file 908 and memory locations in shared memory/L1 cache 918. The interconnect network 916 may utilize the disclosed mechanisms to route optical signals between particular source and destination components of the system.

The shared memory/L1 cache 918 is an array of on-chip memory that allows for data storage and communication between the streaming multiprocessor 900 and the primitive engine 712 and between threads in the streaming multiprocessor 900. In an embodiment, the shared memory/L1 cache 918 comprises 128 KB of storage capacity and is in the path from the streaming multiprocessor 900 to the memory partition unit 800. The shared memory/L1 cache 918 can be used to cache reads and writes. One or more of the shared memory/L1 cache 918, level two cache 804, and memory 612 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 918 enables the shared memory/L1 cache 918 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 6, are bypassed, creating a much simpler programming model. In the general purpose parallel computation configuration, the work distribution unit 610 assigns and distributes blocks of threads directly to the data processing cluster 706 modules. The threads in a block execute the same program, using a unique thread ID in the calculation to ensure each thread generates unique results, using the streaming multiprocessor 900 to execute the program and perform calculations, shared memory/L1 cache 918 to communicate between threads, and the load/store unit 914 to read and write global memory through the shared memory/L1 cache 918 and the memory partition unit 800. When configured for general purpose parallel computation, the streaming multiprocessor 900 can also write commands that the scheduler unit 608 can use to launch new work on the data processing cluster 706 modules.

The parallel processing unit 620 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 620 is embodied on a single semiconductor substrate. In another embodiment, the parallel processing unit 620 is included in a system-on-a-chip (SoC) along with one or more other devices such as additional parallel processing unit 620 modules, the memory 612, a reduced instruction set computer (RISC) CPU, a memory management unit (MMU), a digital-to-analog converter (DAC), and the like.

In an embodiment, the parallel processing unit 620 may be included on a graphics card that includes one or more memory devices. The graphics card may be configured to interface with a PCIe slot on a motherboard of a desktop computer. In yet another embodiment, the parallel processing unit 620 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 10:
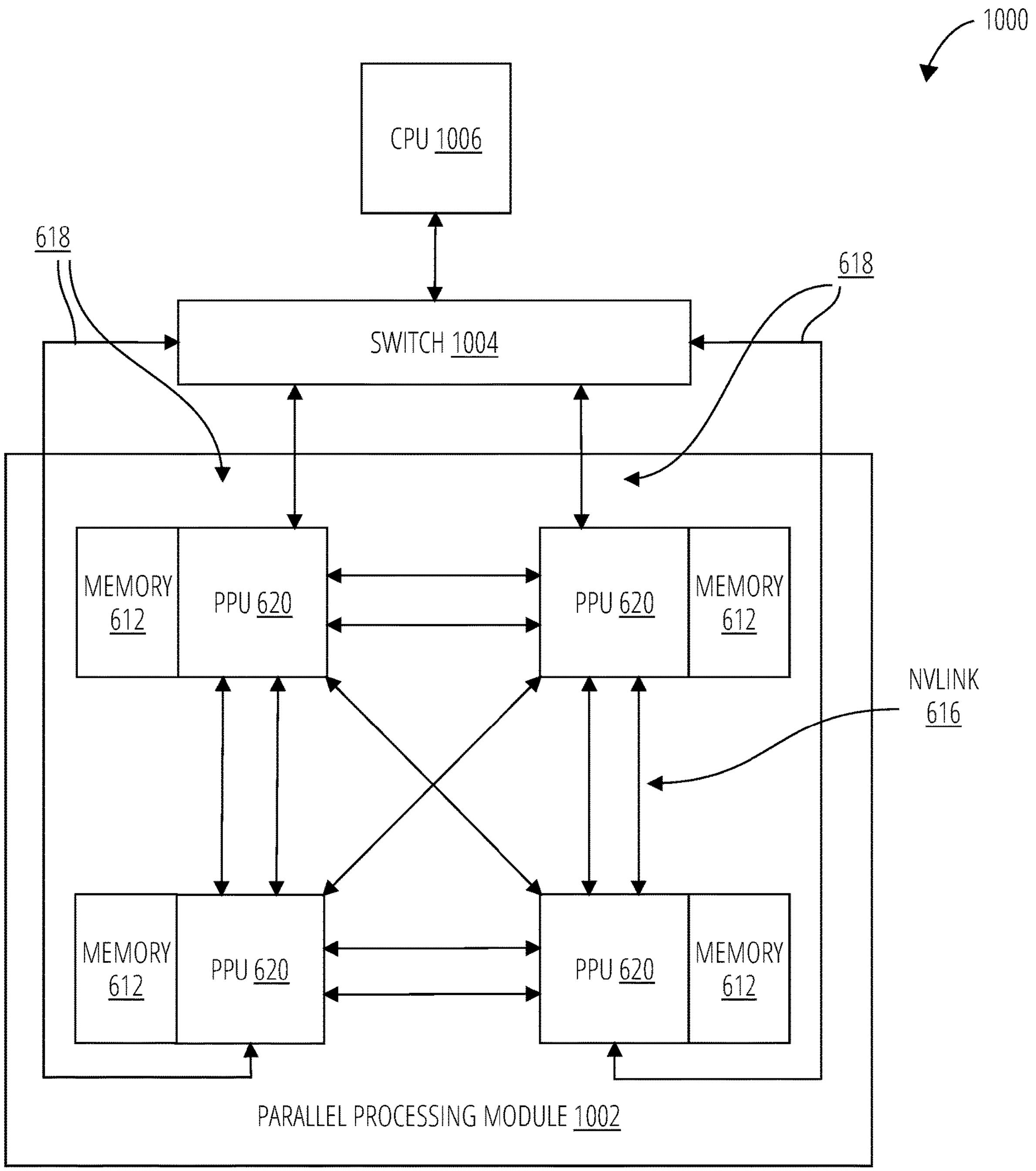
FIG. 10 depicts a processing system 1000 in accordance with one embodiment.

FIG. 10 is a conceptual diagram of a processing system 1000 implemented using the parallel processing unit 620 of FIG. 6, in accordance with an embodiment. The processing system 1000 includes a central processing unit 1006, switch 1004, and multiple parallel processing unit 620 modules each and respective memory 612 modules. The NVLink 616 provides high-speed communication links between each of the parallel processing unit 620 modules. Although a particular number of NVLink 616 and interconnect 618 connections are illustrated in FIG. 10, the number of connections to each parallel processing unit 620 and the central processing unit 1006 may vary. The switch 1004 interfaces between the interconnect 618 and the central processing unit 1006. The parallel processing unit 620 modules, memory 612 modules, and NVLink 616 connections may be situated on a single semiconductor platform to form a parallel processing module 1002. In an embodiment, the switch 1004 supports two or more protocols to interface between various different connections and/or links.

In another embodiment (not shown), the NVLink 616 provides one or more high-speed communication links between each of the parallel processing unit modules (parallel processing unit 620, parallel processing unit 620, parallel processing unit 620, and parallel processing unit 620) and the central processing unit 1006 and the switch 1004 interfaces between the interconnect 618 and each of the parallel processing unit modules. The parallel processing unit modules, memory 612 modules, and interconnect 618 may be situated on a single semiconductor platform to form a parallel processing module 1002. In yet another embodiment (not shown), the interconnect 618 provides one or more communication links between each of the parallel processing unit modules and the central processing unit 1006 and the switch 1004 interfaces between each of the parallel processing unit modules using the NVLink 616 to provide one or more high-speed communication links between the parallel processing unit modules. In another embodiment (not shown), the NVLink 616 provides one or more high-speed communication links between the parallel processing unit modules and the central processing unit 1006 through the switch 1004. In yet another embodiment (not shown), the interconnect 618 provides one or more communication links between each of the parallel processing unit modules directly. One or more of the NVLink 616 high-speed communication links may be implemented as a physical NVLink interconnect or either an on-chip or on-die interconnect using the same protocol as the NVLink 616.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1002 may be implemented as a circuit board substrate and each of the parallel processing unit modules and/or memory 612 modules may be packaged devices. In an embodiment, the central processing unit 1006, switch 1004, and the parallel processing module 1002 are situated on a single semiconductor platform.

In an embodiment, the signaling rate of each NVLink 616 is 20 to 25 Gigabits/second and each parallel processing unit module includes six NVLink 616 interfaces (as shown in FIG. 10, five NVLink 616 interfaces are included for each parallel processing unit module). Each NVLink 616 provides a data transfer rate of 25 Gigabytes/second in each direction, with six links providing 300 Gigabytes/second. The NVLink 616 can be used exclusively for PPU-to-PPU communication as shown in FIG. 10, or some combination of PPU-to-PPU and PPU-to-CPU, when the central processing unit 1006 also includes one or more NVLink 616 interfaces.

In an embodiment, the NVLink 616 allows direct load/store/atomic access from the central processing unit 1006 to each parallel processing unit module's memory 612. In an embodiment, the NVLink 616 supports coherency operations, allowing data read from the memory 612 modules to be stored in the cache hierarchy of the central processing unit 1006, reducing cache access latency for the central processing unit 1006. In an embodiment, the NVLink 616 includes support for Address Translation Services (ATS), enabling the parallel processing unit module to directly access page tables within the central processing unit 1006. One or more of the NVLink 616 may also be configured to operate in a low-power mode.

Figure 11:
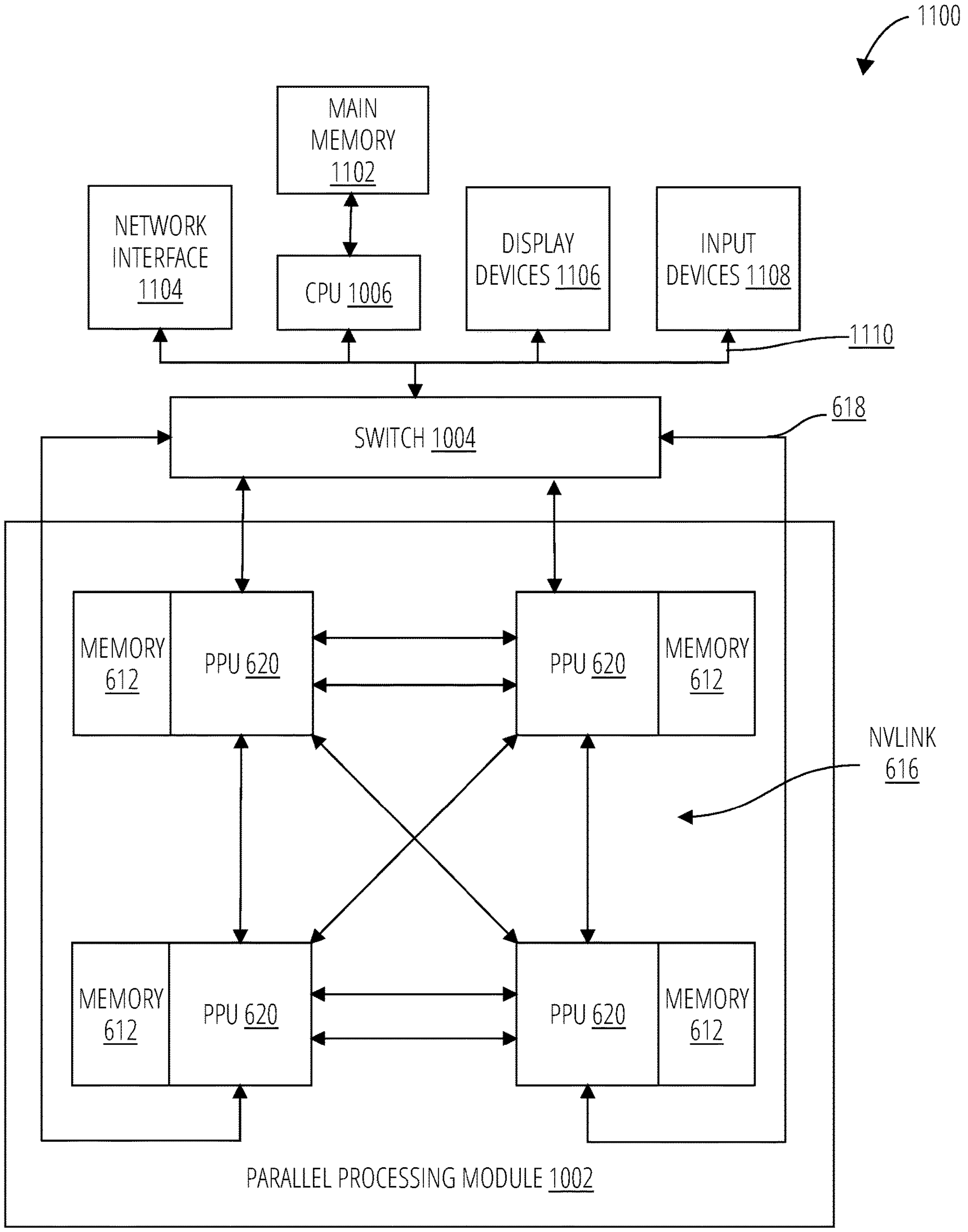
FIG. 11 depicts an exemplary processing system 1100 in accordance with another embodiment.

FIG. 11 depicts an exemplary processing system 1100 in which the various architecture and/or functionality of the various previous embodiments may be implemented. As shown, an exemplary processing system 1100 is provided including at least one central processing unit 1006 that is connected to a communications bus 1110. The communication communications bus 1110 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1100 also includes a main memory 1102. Control logic (software) and data are stored in the main memory 1102 which may take the form of random access memory (RAM).

The exemplary processing system 1100 also includes input devices 1108, the parallel processing module 1002, and display devices 1106, e.g. a conventional CRT (cathode ray tube), LCD (liquid crystal display), LED (light emitting diode), plasma display or the like. User input may be received from the input devices 1108, e.g., keyboard, mouse, touchpad, microphone, and the like. Each of the foregoing modules and/or devices may even be situated on a single semiconductor platform to form the exemplary processing system 1100. Alternately, the various modules may also be situated separately or in various combinations of semiconductor platforms per the desires of the user.

Further, the exemplary processing system 1100 may be coupled to a network (e.g., a telecommunications network, local area network (LAN), wireless network, wide area network (WAN) such as the Internet, peer-to-peer network, cable network, or the like) through a network interface 1104 for communication purposes.

The exemplary processing system 1100 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1102 and/or the secondary storage. Such computer programs, when executed, enable the exemplary processing system 1100 to perform various functions. The main memory 1102, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1100 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 12:
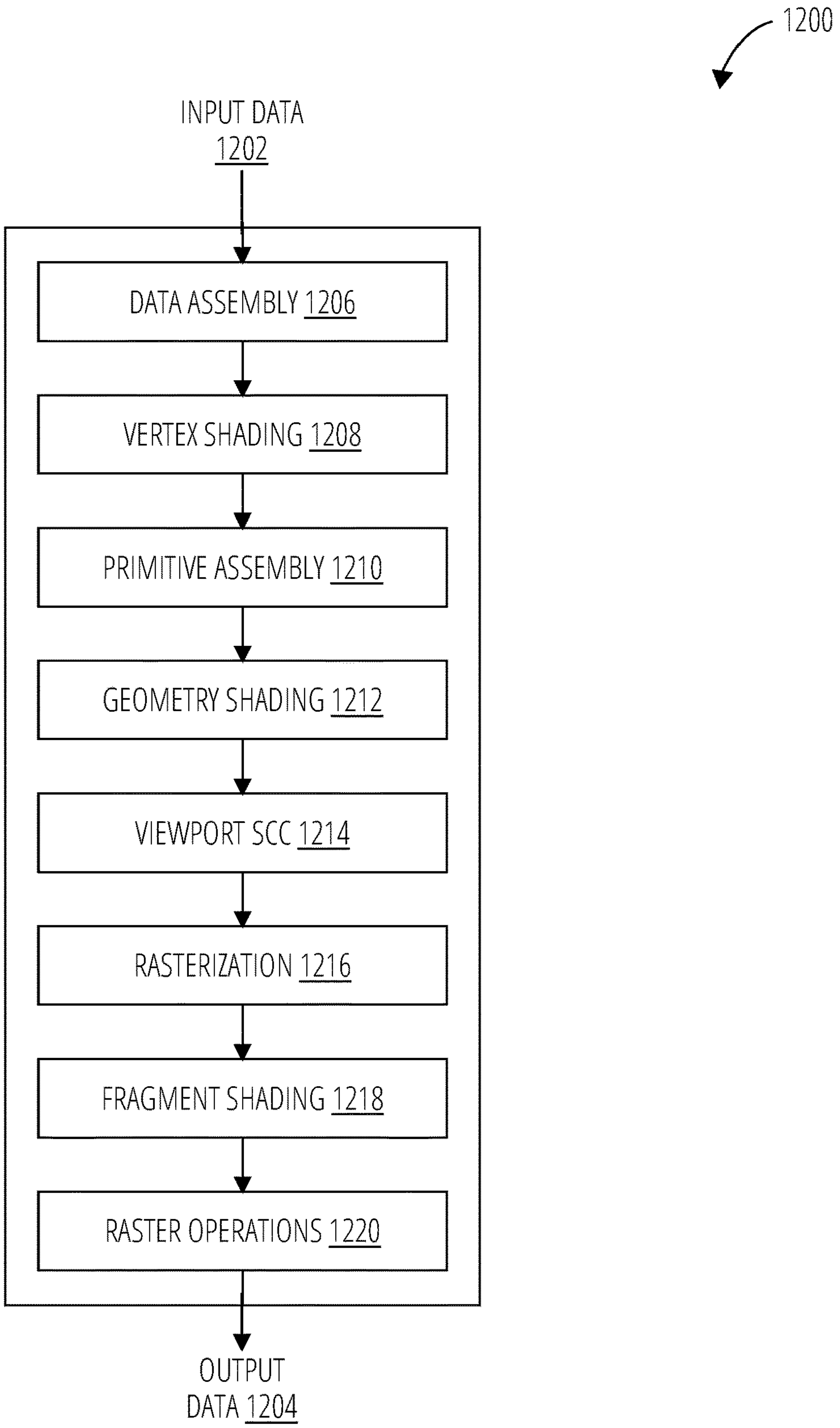
FIG. 12 depicts a graphics processing pipeline 1200 in accordance with one embodiment.

FIG. 12 is a conceptual diagram of a graphics processing pipeline 1200 implemented by the parallel processing unit 620 of FIG. 6, in accordance with an embodiment. In an embodiment, the parallel processing unit 620 comprises a graphics processing unit (GPU). The parallel processing unit 620 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 620 can be configured to process the graphics primitives to generate a frame buffer (e.g., pixel data for each of the pixels of the display).

An application writes model data for a scene (e.g., a collection of vertices and attributes) to a memory such as a system memory or memory 612. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 900 modules of the parallel processing unit 620 including one or more of a vertex shader, hull shader, domain shader, geometry shader, and a pixel shader. For example, one or more of the streaming multiprocessor 900 modules may be configured to execute a vertex shader program that processes a number of vertices defined by the model data. In an embodiment, the different streaming multiprocessor 900 modules may be configured to execute different shader programs concurrently. For example, a first subset of streaming multiprocessor 900 modules may be configured to execute a vertex shader program while a second subset of streaming multiprocessor 900 modules may be configured to execute a pixel shader program. The first subset of streaming multiprocessor 900 modules processes vertex data to produce processed vertex data and writes the processed vertex data to the level two cache 804 and/or the memory 612. After the processed vertex data is rasterized (e.g., transformed from three-dimensional data into two-dimensional data in screen space) to produce fragment data, the second subset of streaming multiprocessor 900 modules executes a pixel shader to produce processed fragment data, which is then blended with other processed fragment data and written to the frame buffer in memory 612. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1200 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1200 receives input data 601 that is transmitted from one stage to the next stage of the graphics processing pipeline 1200 to generate output data 1204. In an embodiment, the graphics processing pipeline 1200 may represent a graphics processing pipeline defined by the OpenGL® API. As an option, the graphics processing pipeline 1200 may be implemented in the context of the functionality and architecture of the previous Figures and/or any subsequent Figure(s).

As shown in FIG. 12, the graphics processing pipeline 1200 comprises a pipeline architecture that includes a number of stages. The stages include, but are not limited to, a data assembly 1206 stage, a vertex shading 1208 stage, a primitive assembly 1210 stage, a geometry shading 1212 stage, a viewport SCC 1214 stage, a rasterization 1216 stage, a fragment shading 1218 stage, and a raster operations 1220 stage. In an embodiment, the input data 1202 comprises commands that configure the processing units to implement the stages of the graphics processing pipeline 1200 and geometric primitives (e.g., points, lines, triangles, quads, triangle strips or fans, etc.) to be processed by the stages. The output data 1204 may comprise pixel data (e.g., color data) that is copied into a frame buffer or other type of surface data structure in a memory.

The data assembly 1206 stage receives the input data 1202 that specifies vertex data for high-order surfaces, primitives, or the like. The data assembly 1206 stage collects the vertex data in a temporary storage or queue, such as by receiving a command from the host processor that includes a pointer to a buffer in memory and reading the vertex data from the buffer. The vertex data is then transmitted to the vertex shading 1208 stage for processing.

The vertex shading 1208 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1208 stage may manipulate individual vertex attributes such as position, color, texture coordinates, and the like. In other words, the vertex shading 1208 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1208 stage generates transformed vertex data that is transmitted to the primitive assembly 1210 stage.

The primitive assembly 1210 stage collects vertices output by the vertex shading 1208 stage and groups the vertices into geometric primitives for processing by the geometry shading 1212 stage. For example, the primitive assembly 1210 stage may be configured to group every three consecutive vertices as a geometric primitive (e.g., a triangle) for transmission to the geometry shading 1212 stage. In some embodiments, specific vertices may be reused for consecutive geometric primitives (e.g., two consecutive triangles in a triangle strip may share two vertices). The primitive assembly 1210 stage transmits geometric primitives (e.g., a collection of associated vertices) to the geometry shading 1212 stage.

The geometry shading 1212 stage processes geometric primitives by performing a set of operations (e.g., a geometry shader or program) on the geometric primitives. Tessellation operations may generate one or more geometric primitives from each geometric primitive. In other words, the geometry shading 1212 stage may subdivide each geometric primitive into a finer mesh of two or more geometric primitives for processing by the rest of the graphics processing pipeline 1200. The geometry shading 1212 stage transmits geometric primitives to the viewport SCC 1214 stage.

In an embodiment, the graphics processing pipeline 1200 may operate within a streaming multiprocessor and the vertex shading 1208 stage, the primitive assembly 1210 stage, the geometry shading 1212 stage, the fragment shading 1218 stage, and/or hardware/software associated therewith, may sequentially perform processing operations. Once the sequential processing operations are complete, in an embodiment, the viewport SCC 1214 stage may utilize the data. In an embodiment, primitive data processed by one or more of the stages in the graphics processing pipeline 1200 may be written to a cache (e.g. L1 cache, a vertex cache, etc.). In this case, in an embodiment, the viewport SCC 1214 stage may access the data in the cache. In an embodiment, the viewport SCC 1214 stage and the rasterization 1216 stage are implemented as fixed function circuitry.

The viewport SCC 1214 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1216 stage.

The rasterization 1216 stage converts the 3D geometric primitives into 2D fragments (e.g. capable of being utilized for display, etc.). The rasterization 1216 stage may be configured to utilize the vertices of the geometric primitives to setup a set of plane equations from which various attributes can be interpolated. The rasterization 1216 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1216 stage generates fragment data (e.g., interpolated vertex attributes associated with a particular sample location for each covered pixel) that are transmitted to the fragment shading 1218 stage.

The fragment shading 1218 stage processes fragment data by performing a set of operations (e.g., a fragment shader or a program) on each of the fragments. The fragment shading 1218 stage may generate pixel data (e.g., color values) for the fragment such as by performing lighting operations or sampling texture maps using interpolated texture coordinates for the fragment. The fragment shading 1218 stage generates pixel data that is transmitted to the raster operations 1220 stage.

The raster operations 1220 stage may perform various operations on the pixel data such as performing alpha tests, stencil tests, and blending the pixel data with other pixel data corresponding to other fragments associated with the pixel. When the raster operations 1220 stage has finished processing the pixel data (e.g., the output data 1204), the pixel data may be written to a render target such as a frame buffer, a color buffer, or the like.

It will be appreciated that one or more additional stages may be included in the graphics processing pipeline 1200 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1212 stage). Other types of graphics processing pipelines are contemplated as being within the scope of the present disclosure. Furthermore, any of the stages of the graphics processing pipeline 1200 may be implemented by one or more dedicated hardware units within a graphics processor such as parallel processing unit 620. Other stages of the graphics processing pipeline 1200 may be implemented by programmable hardware units such as the streaming multiprocessor 900 of the parallel processing unit 620.

The graphics processing pipeline 1200 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 620. The API provides an abstraction for a programmer that lets a programmer utilize specialized graphics hardware, such as the parallel processing unit 620, to generate the graphical data without requiring the programmer to utilize the specific instruction set for the parallel processing unit 620. The application may include an API call that is routed to the device driver for the parallel processing unit 620. The device driver interprets the API call and performs various operations to respond to the API call. In some instances, the device driver may perform operations by executing instructions on the CPU. In other instances, the device driver may perform operations, at least in part, by launching operations on the parallel processing unit 620 utilizing an input/output interface between the CPU and the parallel processing unit 620. In an embodiment, the device driver is configured to implement the graphics processing pipeline 1200 utilizing the hardware of the parallel processing unit 620.

Various programs may be executed within the parallel processing unit 620 in order to implement the various stages of the graphics processing pipeline 1200. For example, the device driver may launch a kernel on the parallel processing unit 620 to perform the vertex shading 1208 stage on one streaming multiprocessor 900 (or multiple streaming multiprocessor 900 modules). The device driver (or the initial kernel executed by the parallel processing unit 620) may also launch other kernels on the parallel processing unit 620 to perform other stages of the graphics processing pipeline 1200, such as the geometry shading 1212 stage and the fragment shading 1218 stage. In addition, some of the stages of the graphics processing pipeline 1200 may be implemented on fixed unit hardware such as a rasterizer or a data assembler implemented within the parallel processing unit 620. It will be appreciated that results from one kernel may be processed by one or more intervening fixed function hardware units before being processed by a subsequent kernel on a streaming multiprocessor 900.

LISTING OF DRAWING ELEMENTS

102 drop filter
104 light guide
106 avalanche photo-diode
108 trans-impedance amplifier
110 correlator
202 channel codes
204 CDMA symbol generator
206 wavelength drop filters
208 laser
210 receiver
212 receiver
214*a* light guide
214*b* light guide
302 polarization tracker
402 source and destination codes
404 optical crossbar switch

406 source
408 destination M
410 destination P
602 I/O unit
604 front-end unit
606 hub
608 scheduler unit
610 work distribution unit
612 memory
614 crossbar
616 NVLink
618 interconnect
620 parallel processing unit
700 general processing cluster
702 pipeline manager
704 pre-raster operations unit
706 data processing cluster
708 raster engine
710 M-pipe controller
712 primitive engine
714 work distribution crossbar
716 memory management unit
800 memory partition unit
802 raster operations unit
804 level two cache
806 memory interface
900 streaming multiprocessor
902 instruction cache
904 scheduler unit
906 dispatch
908 register file
910 core
912 special function unit
914 load/store unit
916 interconnect network
918 shared memory/L1 cache
1000 processing system
1002 parallel processing module
1004 switch
1006 central processing unit
1100 exemplary processing system
1102 main memory
1104 network interface
1106 display devices
1108 input devices
1110 communications bus
1200 graphics processing pipeline
1202 input data
1204 output data
1206 data assembly
1208 vertex shading
1210 primitive assembly
1212 geometry shading
1214 viewport SCC
1216 rasterization
1218 fragment shading
1220 raster operations Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. An optical transmitter comprising:

at least one laser configured to generate a wave division multiplex (WDM) on a light guide; and a Code Division Multiple Access (CDMA) symbol generator coupled to modulate CDMA symbols on the light guide across a plurality of channels of the WDM;

a detector configured to tap the light guide for a detected signal; and logic to identify from the detected signal a metric of crosstalk between the WDM channels.

2. The optical transmitter of claim 1, configured to apply the metric of crosstalk to tune one or more drop filters on the light guide.

3. The optical transmitter of claim 1, configured to apply the metric of crosstalk to tune one or more polarization trackers on the light guide.

4. The optical transmitter of claim 1, wherein the CDMA symbol generator is configured to encode source and destination identifiers for the WDM channels on the light guide.

5. The optical transmitter of claim 4, further comprising:

a plurality of correlators each configured to identify a source identifier and a destination identifier for a respective one of the WDM channels.

6. The optical transmitter of claim 5, further comprising an optical switch configured to apply the source identifiers and destination identifiers to route the WDM channels.

7. The optical transmitter of claim 1, wherein the CDMA symbol generator is configured to encode a security key or authentication code onto the light guide.

8. An optical communication system comprising:

at least one wave division multiplex (WDM) transmitter configured to generate WDM signals in a plurality of channels on a light guide;

a Code Division Multiple Access (CDMA) symbol generator coupled to generate CDMA symbols on the light guide below a noise floor of the WDM signals;

a detector configured to tap the light guide for a detected signal; and a correlator configured to identify from the detected signal a metric of crosstalk between the WDM channels.

9. The optical communication system of claim 8, configured to apply the metric of crosstalk to tune one or more optical filters on the light guide.

10. The optical communication system of claim 8, configured to apply the metric of crosstalk to tune one or more polarization trackers on the light guide.

11. The optical communication system of claim 8, wherein the CDMA symbol generator is configured to encode source and destination identifiers for the WDM signals on the light guide.

12. The optical communication system of claim 11, further comprising:

the correlator configured to identify a source identifier and a destination identifier for one of the WDM channels.

13. The optical communication system of claim 12, further comprising an optical switch configured to apply the source identifiers and destination identifiers to route the WDM signals.

14. The optical communication system of claim 8, wherein the CDMA symbol generator is configured to encode a security key or authentication code onto the light guide.

15. An optical communication process comprising:

generating a wave division multiplex (WDM) on a light guide;

generating Code Division Multiple Access (CDMA) symbols on the light guide spread across a plurality of channels of the WDM; and extracting the CDMA symbols and applying the extracted CDMA symbols to generate a metric of crosstalk between two or more of the WDM channels.

16. The optical communication process of claim 15, wherein the CDMA symbols comprise source and destination identifiers for the WDM channels.

17. The optical communication process of claim 15, wherein the CDMA symbols comprise a security key or authentication code.

* * * * *